United States Patent
Zeliff et al.

(10) Patent No.: US 9,116,571 B2
(45) Date of Patent: Aug. 25, 2015

(54) METHOD AND SYSTEM OF DATA INPUT FOR AN ELECTRONIC DEVICE EQUIPPED WITH A TOUCH SCREEN

(71) Applicant: Adonit Co., Ltd., Taipei (TW)

(72) Inventors: Zachary Joseph Zeliff, Taipei (TW); Yueh-Hua Li, Taipei (TW); Nate Lokers, Taipei (TW); Kris Perpich, Taipei (TW)

(73) Assignee: ADONIT CO., LTD., Taipei (TW)

( * ) Notice: Subject to any disclaimer, the term of this patent is extended or adjusted under 35 U.S.C. 154(b) by 245 days.

(21) Appl. No.: 13/669,397

(22) Filed: Nov. 5, 2012

(65) Prior Publication Data

US 2013/0257793 A1 Oct. 3, 2013

Related U.S. Application Data

(60) Provisional application No. 61/615,908, filed on Mar. 27, 2012.

(51) Int. Cl.
G06F 3/033 (2013.01)
G06F 3/041 (2006.01)
G06F 3/044 (2006.01)

(52) U.S. Cl.
CPC .............. *G06F 3/0416* (2013.01); *G06F 3/044* (2013.01)

(58) Field of Classification Search
CPC ................................ G06F 3/0416; G06F 3/044
USPC ........................................................ 345/174
See application file for complete search history.

(56) References Cited

U.S. PATENT DOCUMENTS

| 8,976,127 | B2 | 3/2015 | Han |
| 2009/0153526 | A1* | 6/2009 | Blake et al. .................... 345/179 |
| 2010/0051356 | A1 | 3/2010 | Stern et al. |
| 2010/0146457 | A1* | 6/2010 | Thimbleby et al. ........... 715/863 |
| 2010/0252335 | A1 | 10/2010 | Orsley |
| 2011/0055753 | A1* | 3/2011 | Horodezky et al. ........... 715/810 |
| 2011/0120359 | A1* | 5/2011 | Sekine ......................... 112/102.5 |
| 2011/0304577 | A1* | 12/2011 | Brown et al. .................. 345/174 |
| 2012/0068964 | A1 | 3/2012 | Wright et al. |
| 2012/0092277 | A1* | 4/2012 | Momchilov ................... 345/173 |
| 2012/0105361 | A1 | 5/2012 | Kremin et al. |
| 2012/0113047 | A1* | 5/2012 | Hanauer et al. ............... 345/174 |
| 2012/0127110 | A1 | 5/2012 | Amm et al. |
| 2012/0139879 | A1 | 6/2012 | Kim et al. |
| 2013/0002599 | A1* | 1/2013 | Townsley et al. ............. 345/174 |
| 2013/0033437 | A1* | 2/2013 | Lee et al. ...................... 345/173 |
| 2013/0106722 | A1* | 5/2013 | Shahparnia et al. .......... 345/173 |
| 2013/0194223 | A1* | 8/2013 | Ward et al. .................... 345/174 |

* cited by examiner

*Primary Examiner* — Aneeta Yodichkas
*Assistant Examiner* — Neil Wood
(74) *Attorney, Agent, or Firm* — Novak Druce Connolly Bove + Quigg LLP

(57) ABSTRACT

Systems and methods are disclosed for differentiating between stylus touches and non-stylus touches on a touch-screen device. A stylus emits a signal, received by the touch-screen device, and software selects a touch, the touch start event for which occurred near the time of the signal, and the size and location of which best fit filters, as being the touch made by the stylus. The software associates that touch with the stylus until the touch ends, or until the stylus emits a signal indicating that contact has ended. The signal may be mechanically generated audio, such as from the stylus contacting the screen, or electronic (audio, RF, IR), generated by the stylus upon detecting pressure or capacitive flux. The methods and systems allow software to perform palm rejection filtering, to track one stylus or multiple styluses, and to ignore touches triggered by dirt, rain, and other environmental causes.

20 Claims, 13 Drawing Sheets

METHOD AND SYSTEM OF DATA INPUT FOR AN ELECTRONIC DEVICE EQUIPPED WITH A TOUCH SCREEN

CROSS-REFERENCES TO RELATED APPLICATIONS

This application claims the benefit of priority to U.S. provisional patent application No. 61/615,908, filed Mar. 27, 2012, and entitled "METHOD AND SYSTEM OF DATA INPUT FOR A DEVICE EQUIPPED WITH A TOUCH SCREEN", the disclosure of which is hereby incorporated by reference in its entirety.

BACKGROUND OF THE INVENTION

1. Field of the Disclosure

The disclosure relates to computer data input, and more specifically, to a method and system of data input for an electronic device equipped with a touch screen.

2. Description of the Related Art

With recent innovations in functionality and application development, touch screens are experiencing a dramatic surge in popularity for electronic device input.

Compared to conventional input, such as a keyboard and/or a pointing device, touch screens provide a considerable improvement in convenience; no external devices or bulky real-estate-hogging components are required, since the screen can mimic the functionality of a keyboard via software when desired, and positions can be indicated directly on the screen via touch rather than indirectly chosen by using a separate mouse (or joystick, eraserhead, touchpad, or other controller) to move a virtual cursor. However, touch screens register input from simple screen surface contact or capacitive flux sensing only, with variations in input detection generally limited to initial contact and sliding contact. Capacitive sensing devices are of low resolution, prone to noisy signals, and at the hardware level report a matrix of sensed capacitances; the hardware then processes the matrix to filter out the noise, finally sending a touch event, containing the center and size, for each pattern that exceeds an arbitrarily chosen threshold. Because of the noisy signal, touch events are generated only for large patterns. The threshold is usually chosen to find touches that are from a fingertip-sized touch, for example 10 mm in diameter. Furthermore, the means of initiating the contact, such as by fingertip, by stylus, or by other means, cannot be determined; for example, using a touchscreen outdoors during a rainstorm can result in random "touches" from large-enough raindrops or the puddles they form. Lastly, capacitive touch screens do not actually detect contact, they detect the capacitance of any large-enough conductive objects that are near the screen; bringing a finger close to a touchscreen can generate an event even when the user is hesitating about, for example, clicking on a "buy it now" button.

Hardware solutions raise the cost of devices. High-resolution touchscreens are available, but are expensive; raising the gain of lower-resolution capacitive sensing devices increases noise and hence false detection of contacts, in addition to draining batteries much more quickly.

As a consequence, users are forced to use awkward holding methods to avoid inadvertent contact with the touchscreen that would otherwise result in unwanted input, or else the users must deal with unwanted input that occurs from touching the touchscreen with their palms and fingers. Unlike writing on a pad of paper, where the user typically rests his palm against the pad, on a touchscreen the user must keep his hand away from the screen.

The rejection of unwanted input is sometimes referred to as the "palm rejection" problem, where resting the palm of the hand on the touchscreen or gripping the touchscreen device with fingers touching the touchscreen, while using a finger or a stylus to generate a desired input, causes the device also to register inadvertent undesired input from the hand contact. One solution would be to require the use of a special input tool at all times, but this lacks flexibility and impairs convenience for the user, and may increase manufacturing costs in order to create touchscreen hardware that would detect the difference between the tool's touch and a finger/palm/other non-tool touch. Moreover, not all such contacts are unwanted; a user may choose to switch between the use of a stylus for precision and a finger for convenience, even while using the same application, for example when switching between drawing a sketch (stylus) and touching menu controls (finger); and yet a user may need to stabilize a hand against the device touchscreen, for example when in a moving vehicle on a bumpy road, in order to use a stylus with sufficient precision to generate desired input, for example when using a stylus to select a position for input into a map application. Because of these conflicting user needs, the problem of palm rejection is a difficult one.

Thus, what is called for is a method and system of data input for an electronic device equipped with a touch screen addressing the limitations described.

SUMMARY OF THE PRESENT INVENTION

Embodiments are disclosed detailing systems and methods for selectively filtering input made by a stylus on a touchscreen-equipped device. The device receives externally generated signals made by the stylus, and methods implemented by the system either in hardware or in software correlate these signals with touch events received from the existing touchscreen hardware. These methods comprise receiving at least one touch event, each touch event of the at least one touch event comprising a type, an identifier, and a timestamp, selecting a subset of touch events from the at least one touch event, adding each touch event of the subset of touch events to a queue of touch events, receiving a contact event, the contact event comprising a timestamp, when the contact event is a contact start event, then selecting a set of touch events from the queue of touch events, wherein the type of each touch event in the set of touch events is a touch start type, and the timestamp of each touch event in the set of touch events is within a predetermined duration of the timestamp of the contact event; and when the set is not null, then selecting a touch event from the set of touch events, and storing the identifier of the touch event as an associated touch identifier.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following detailed description of embodiments of the invention references the accompanying drawings that form a part hereof, and in which is shown by way of illustration specific embodiments in which the invention may be practiced. The embodiments are described in sufficient detail to enable those skilled in the art to practice the invention, and it is to be understood that other embodiments may be utilized and that logical changes may be made without departing from the spirit and scope of the present invention. The following detailed description is, therefore, not to be taken in a limiting sense, and the scope of the present invention is defined solely by the appended claims.

Figure 1:
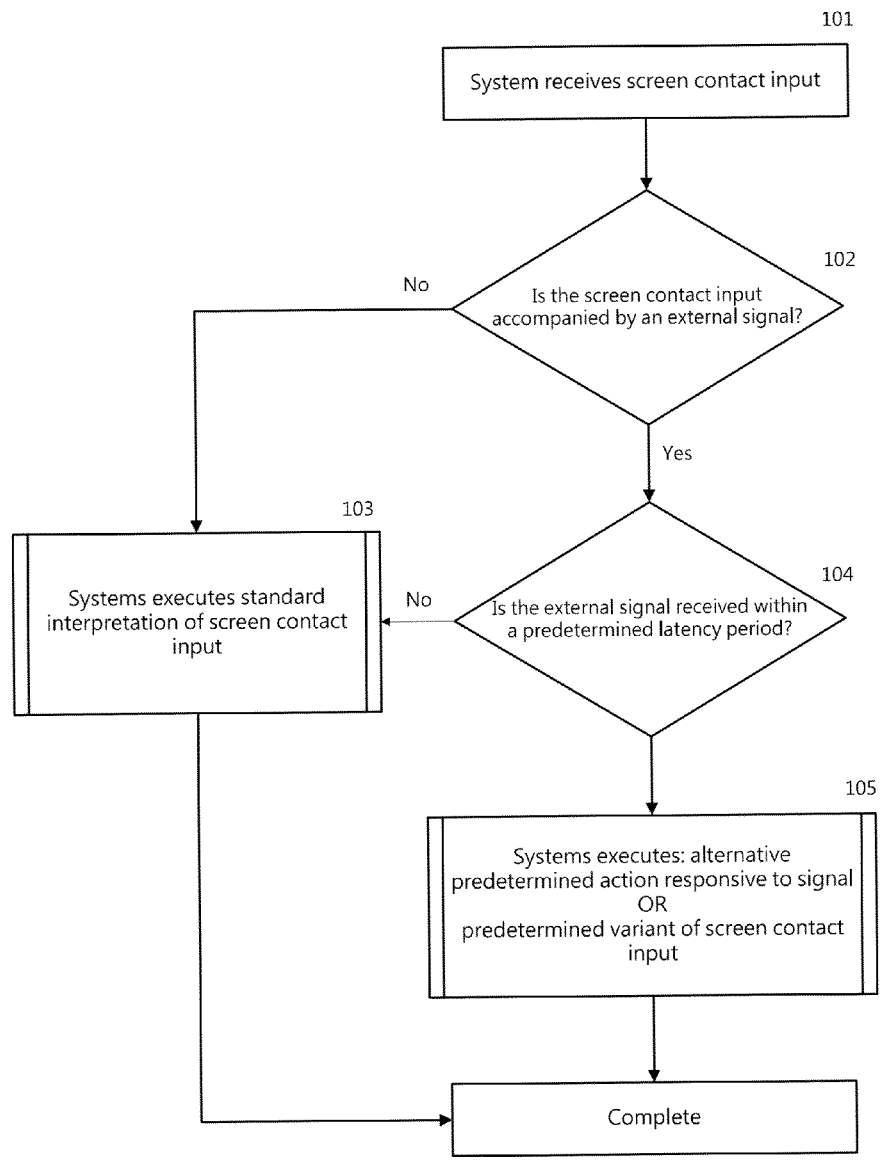
FIG. 1 is a flowchart illustrating a method of data input for an electronic device equipped with a touch screen.

As shown in FIG. 1, a flowchart illustrating a method of data input for an electronic device equipped with a touch screen is disclosed. In step 101, a screen touch start input is received. In step 102, an application installed on the electronic device equipped with a touch screen determines if the screen touch start input is accompanied by an externally generated signal; when the screen touch start input is not accompanied by an externally generated signal, the method continues at step 103, else the method continues at step 104. The externally generated signal may be audio, using a built-in microphone in the electronic device to detect the sound made by a stylus physically touching the touch screen, or may be transmitted by RF, for example via Bluetooth or another protocol or over Wi-Fi, or it may be transmitted by IR, or it may be electrical, for example by an interaction between a stylus and the touchscreen capacitive sensor system. In step 103, the application executes a standard interpretation of the screen contact-based input. In step 104, the method determines whether the externally generated signal accompanies the screen touch start input within a predetermined delay period; this delay period is selected to allow for signal transmission and processing delays, and may be configurable; in current implementations, the delay may be set typically to about 0.5 seconds. If the externally generated signal is not received within the delay period, the application continues at step 103, else the application continues at step 105. If the externally generated signal is received within the preset delay period of when the screen touch start input occurred, in step 105, then a predetermined action responsive to the externally generated signal is executed, or, alternatively, a predetermined variant of the screen contact-based input is executed. In some embodiments, if the externally generated signal is not received within the predetermined delay period, the screen touch start input is ignored by the application; it is classified as an unintentional touch such as might be generated by a palm resting against the screen; conversely, if the externally generated signal is received within the predetermined delay period, then the screen touch start input is accepted by the application; it is classified as an intentional touch that constitutes desired user input. Thus, the method rejects accidental touches made by non-stylus inputs such as a palm touch.

A system of data input for an electronic device equipped with a touch screen as disclosed comprises an electronic device equipped with a touch screen and a communications receptor, and either an application implementing the method of the present invention installed on the electronic device or the method of the present invention implemented in firmware or hardware in the electronic device. A stylus used with the system may comprise a signal generator and a sensor or sensors, such as a pressure sensor and/or a capacitive flux sensor. The system implements a method which may be implemented at a hardware level, in the operating system of the electronic device, or at an application software level either within specific applications or as an intermediary application.

Figure 2:
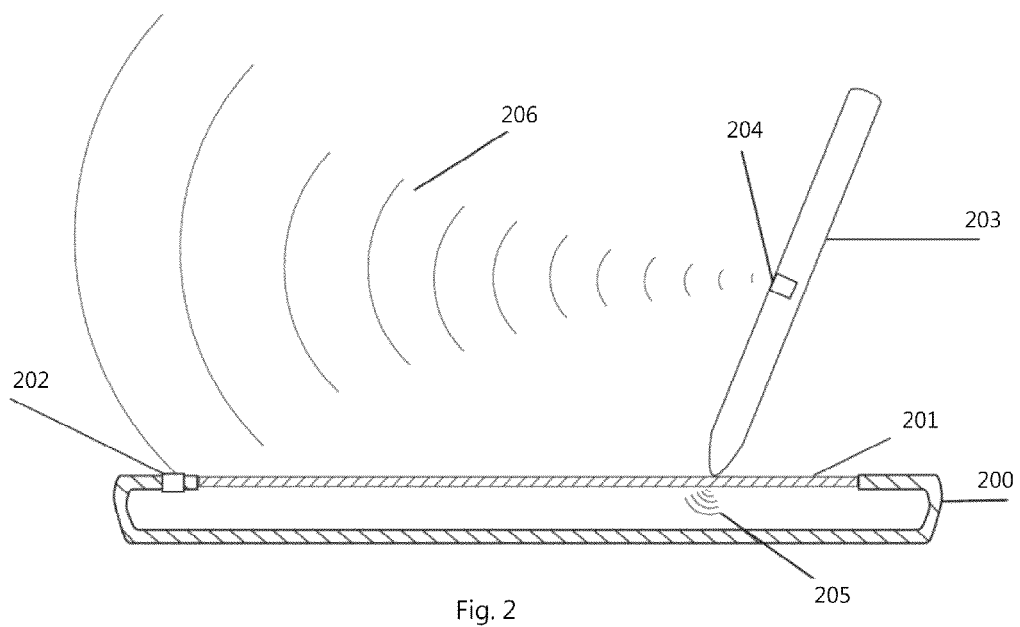
FIG. 2 is an illustration of a stylus with a system of data input for an electronic device equipped with a touch screen.

As shown in FIG. 2, a diagram of an exemplary implementation of a system of data input for an electronic device equipped with a touch screen is disclosed. A stylus 203 generates screen contact-based input 205 on a touch screen 201 of an electronic device 200. In conjunction with the screen contact-based input 205, an externally generated signal 206 is generated by a signal generator 204 incorporated into the stylus 203. The externally generated signal 206 may contain information, such as a flag indicating whether the sensor 207 is or is not sensing contact, a stylus identifier, and/or a sensor reading level. The externally generated signal 206 is received by a receptor 202 which is incorporated into the electronic device 200. An application (not shown) installed on the electronic device equipped with a touch screen 200 determines if the screen contact-based input 205 is accompanied by the externally generated signal 206. If so, the application further determines whether the externally generated signal 206 accompanies the screen contact-based input 205 within a predetermined delay period, in current implementations typically 0.5 sec. If not, the application executes a standard interpretation of the screen contact-based input 205. If the externally generated signal 206 accompanies the screen contact-based input 205 within the predetermined delay period, a predetermined action responsive to the externally generated signal 206 is executed, or, alternatively, a predetermined variant of the screen contact-based input 205 is executed.

The externally generated signal may be sent in a variety of ways. In some embodiments, the stylus 203 may generate a signal when it detects a contact start, i.e., that a sensor detects pressure or capacitive flux meeting (or exceeding) a threshold, and may generate another signal when it detects a contact end, i.e., that a sensor detects pressure or capacitive flux below (or meeting) a threshold. (A person of ordinary skill in the art should recognize that because these thresholds are arbitrarily selected, and may be user-settable, the pairs of "below a threshold/at or above a threshold" and "at or below a threshold/exceeding a threshold" are functionally equivalent, and in embodiments representing sensor levels in digital form, are trivial to switch between.) In some embodiments, the stylus 203 continuously sends a stream of sensor readings to the electronic device 200 regardless of what the sensor is sensing; in these embodiments, software on the electronic device 200 evaluates the stream of sensor readings to detect transitions between contact and no contact, and/or proximity and no proximity. In effect, the system infers stylus contact with the touch screen by evaluating either the level of capacitive flux detected by the stylus, the level of pressure against the stylus tip, or both. For example, a stylus with a pressure sensor may send a stream of pressure readings every 37.5 milliseconds under the Bluetooth restrictions imposed by iOS, or every 6 ms under the restrictions inherent in the Bluetooth protocol as used on other operating systems, the pressure readings indicating the level of force being applied against the stylus tip. Shorter or longer periods may be available under other protocols and communications methods; if using an audio signal transmitted from a stylus with a speaker to an electronic device with a microphone, one-half the sampling frequency of the microphone would be a limit, for example 22.05 kHz. Because inexpensive strain gauges may not reliably return to zero after every use, some embodiments allow a threshold to be set, below which a pressure reading will be treated as zero even if the pressure reading indicates a very low level of pressure; for example, for a stylus transmitting an arbitrary pressure scale of 0-1000, which reliably reads between 0-6 when not in contact with any surface, a threshold value may be set at 20 to provide a reliable indication of pressure against the stylus tip. When a sequence of pressure readings transitions from at-or-below the threshold to above the threshold (or from below the threshold to at-or-above the threshold), then the software generates a stylusPressed event. When a sequence of pressure readings transitions from above the threshold to at-or-below the threshold (or from at-or-above the threshold to below the threshold), then the software generates a stylusReleased event. A person of ordinary skill in the art will recognize that these are functionally equivalent to the stylus itself signaling only when it detects a contact start and when it detects a contact end, merely emulating this behavior through software. In embodiments where the stylus comprises both a pressure sensor and a capacitive flux sensor, the software may further require that capacitive flux be sensed at or above a threshold in order for a stylusPressed event to be generated.

Figure 3:
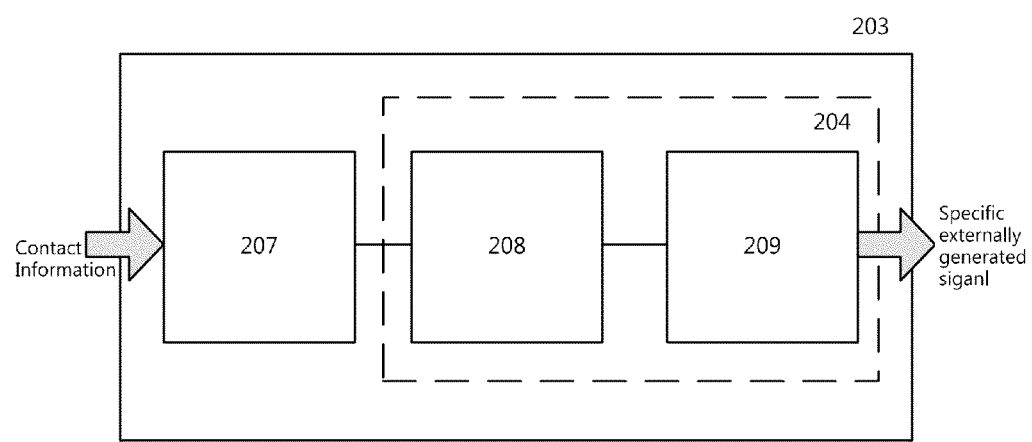
FIG. 3 is a block diagram of the stylus in FIG. 2.

As shown in FIG. 3, a block diagram of the stylus in FIG. 2 is disclosed. The stylus 203 comprises a sensor 207 and the signal generator 204 that comprises a processing electronic device 208 and a signal transmitter 209. The sensor 207 is electrically coupled to the processing electronic device 208, and the processing electronic device 208 is electrically coupled to the signal transmitter 209; thus the sensor 207 is electrically coupled to the signal transmitter 209. The sensor 207 is responsible for sensing contact information, such as pressure, capacitive flux, or light. Therefore, the sensor 207 can be a pressure sensor, a capacitive flux sensor, or an image sensor. The processing electronic device 208 is responsible for collecting the contact information transmitted from the sensor 207.

An embodiment of the system comprises a stylus equipped with a pressure sensor electrically coupled to a Bluetooth transceiver. The embodiment further comprises a tablet computer equipped with a capacitive touch screen and a Bluetooth transceiver; the tablet computer may optionally have accelerometers to monitor the gravitational pull on the tablet computer so as to determine its spatial orientation. The tablet transceiver and the stylus transceiver establish communications, and the stylus transceiver transmits pressure sensor readings about every 37.5 ms. The embodiment further comprises a software application which continuously receives the stream of pressure sensor readings, each of which comprises a timestamp or is assigned a timestamp indicating about when it was received or first processed. The software application also continuously receives touchscreen events, each of which likewise comprises a timestamp as well as an internal operating system ID, and retains a queue of all touchscreen events for a period of 80 ms. The software application uses the method previously described to convert the stream of readings into stylus contact start and stylus contact end events. The software application then correlates these stylus contact events with the touchscreen events by timestamp. When a plurality of touch start events fall within a predefined time interval of a stylus contact start event, the software application selects a single touch start event from the plurality by comparing the positions of the touch start events and selecting the leftmost (with "left" optionally being determined by the tablet computer's determination of its spatial orientation); the software application associates the selected touch start event with the stylus by storing the event's ID. Note that rather than choosing the leftmost-positioned touch start event, the software may have a user-settable option regarding which point to pick; see below in the description of FIG. 13 for more information. When one touch start event falls within a predefined time interval of the stylus contact start event, the software application associates the touchscreen event with the stylus by using the event's ID. When zero touchscreen events fall within a predefined time interval of a stylus contact start event, the software application does not associate any touch with the stylus. The software application subsequently ignores all touchscreen events whose IDs don't match the ID of an associated touch event. Upon receiving a "touch end" event with the associated ID, the application dissociates that ID.

Embodiments may optionally use multiple styluses, in which case such embodiments may associate zero or one touch ID with each stylus at any given time. Embodiments may optionally allow multitouch events to be associated with a stylus contact, or may optionally allow only non-multitouch events to be associated with a stylus. Embodiments may optionally define subregions of the touch screen in which non-associated touches are not ignored, and/or may optionally define subregions of the touch screen in which associated touches are ignored. Embodiments may perform the various methods in the operating system kernel, in intermediary applications, or at the application level.

In FIG. 3, the function of the processing electronic device 208 is to generate a signal. The signal can comprise identification information of the stylus 203 and/or that of the stylus 203. However, the processing electronic device 208 can also transmit only a signal of raw data to the signal transmitter 209. Thus, the signal transmitter 209 can transmit to the electronic device 200 the externally generated signal that contains the signal of processed data or the signal of raw data. It should be noted that the aforementioned signal at least contains the identification information of the stylus 203, such as a simple flag or even more complex identification information.

It should be noted that, while, in the exemplary implementation of the system of data input for an electronic device equipped with a touch screen as disclosed, a stylus is employed to generate the screen contact-based input, the disclosure is not limited thereto, and any effective means of generating screen contact-based input is equally effective and well within the scope of the disclosure.

Further, while, in the exemplary implementation of the system of data input for an electronic device equipped with a touch screen as disclosed, the externally generated signal is generated by a signal generator incorporated into the stylus, the disclosure is not limited thereto, and any effective means of generating the externally generated signal is equally effective and well within the scope of the disclosure, for example, using an audio signature of a stylus contacting the touch screen, as detected by a microphone built into the electronic device 200, to determine when a touch has occurred.

As well, while, in the exemplary implementation of the system of data input for an electronic device equipped with a touch screen as disclosed, the externally generated signal is received by a receptor incorporated into the electronic device, the disclosure is not limited thereto, and any effective means of receiving the externally generated signal is equally effective and well within the scope of the disclosure, for example via IP over wifi or cellular internet, or over USB or other wired connection.

In the method and system of data input for an electronic device equipped with a touch screen, the externally generated signal can be transmitted to the electronic device by any effective method, including but not limited to wireless protocols such as Bluetooth, IR, or sonic-based systems, or hardwired cable-based transmission. Therefore, the signal transmitter 209 may optionally further comprise an antenna in view of a wireless implementation, or cable for a USB connection.

Figure 4:
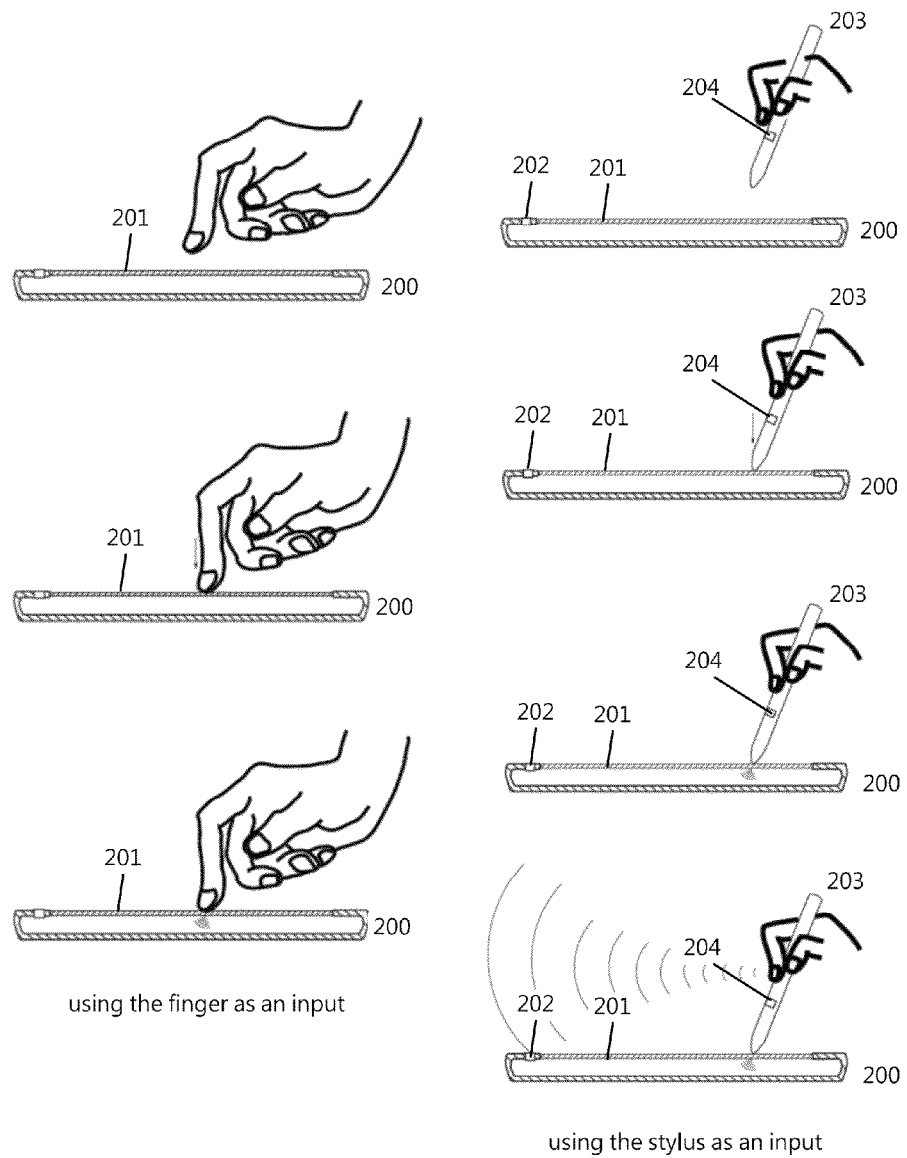
FIG. 4 is an example illustrating the differences between using the finger as an input and using the stylus as an input.

FIG. 4 is an example illustrating the differences between using the finger to generate an input and using the stylus to generate an input. When a finger is used to contact the touch screen 201, the electronic device 200 only senses the position of the finger. The electronic device 200 does not receive an externally generated signal, and therefore can infer that the touch contact is not being made by the stylus. This allows, for example, the application running on the electronic device to ignore the screen contact-based input, i.e., to use palm rejection to reject the input as being an inadvertent and most likely unwanted touch. However, when the stylus 203 equipped with the signal generator 204 is used to contact the touch screen 201, the electronic device senses the position of the stylus 203 and also receives the externally generated signal responsive to an end of the stylus 203 contacting a touch screen of the electronic device 200. Thus, if receiving the externally generated signal within the predetermined delay period, the electronic device 200 will execute a predetermined action or a predetermined variant of the screen contact-based input; for example, this would satisfy the palm rejection algorithm as a valid touch, and the application would not reject the touch as undesired input.

Figure 5:
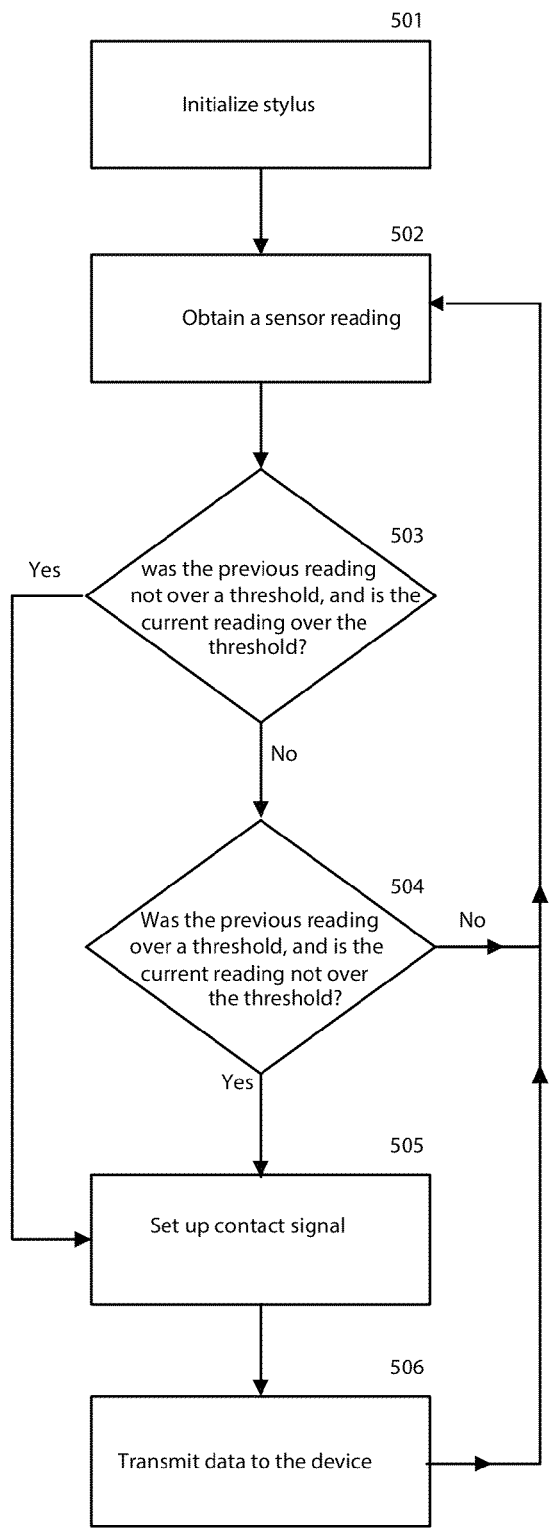
FIG. 5 is a flowchart illustrating an embodiment using a stylus sending data when a contact is detected and/or not detected.

FIG. 5 is a flowchart illustrating the behavior of a stylus that transmits transitional contact events. In step 501, the stylus initializes its internal data structures, for example by zeroing a location containing the previous sensor value, and/or by setting the currently-detected sensor reading as its zero, and/or by initializing the threshold level. In step 502, the sensor is read. In step 503, when the stylus determines that the previous sensor value was not over a threshold value and the current sensor value is over the threshold value, the method continues at step 505, else the method continues at step 504. In step 504, optionally, when the stylus determines that the previous sensor value was over a threshold value and the current sensor value is not over the threshold value, the method continues at step 505, else the method continues at step 502. Note that inferring a contact end in step 504 is optional and may not happen in all embodiments. In step 505 the processing internal device 208 sets up the data to be transmitted to the electronic device 200, such as indicating whether the stylus has detected pressure or flux, or has stopped detecting pressure or flux. In step 506, the signal transmitter 209 transmits the externally generated signal indicating a contact event to the electronic device 200, and then the method continues at step 502.

It should be noted that in some embodiments the signal contains the identification information of the stylus 203. This aids the electronic device 200 in synchronizing the identification information of the stylus 203 with the position of the stylus 203. The position represents the 2D location of the stylus 203 on the touch screen 201. By associating the stylus identification information with the position of the stylus 203, it becomes possible to associate the position with a specific individual stylus from among multiple styluses on a single touchscreen. This may, for example, allow the use of five styluses, one for each fingertip of a typical human hand; or two separate individuals might use two styluses for playing a game.

Figure 6:
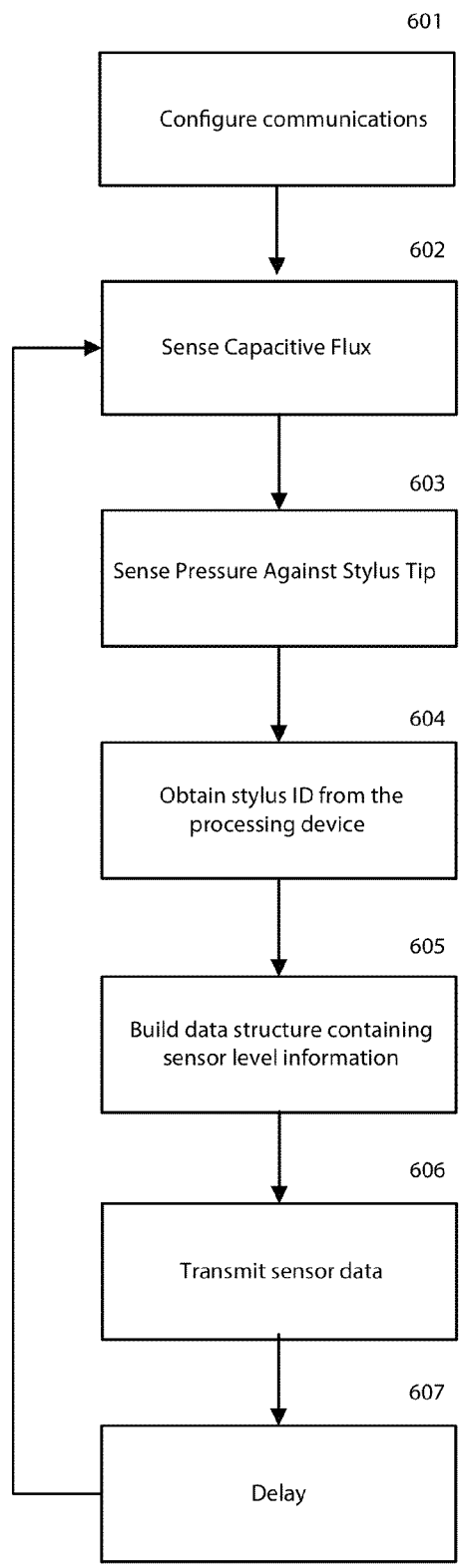
FIG. 6 is a flowchart illustrating an embodiment using a stylus sending periodic sensor readings.

FIG. 6 is a flowchart illustrating the internal loop of the stylus. In embodiments using electronic sensors, such as a capacitive flux sensor or a pressure sensor, these sensors are built into a stylus, which also has a processor and a signal generator. In step 601, the stylus configures its communications with the electronic device 200; this may include determining a delay value for use later in step 607. In step 602, in embodiments where the stylus comprises a capacitive flux sensor, the capacitive flux sensor continuously detects the current level of capacitive flux. In step 603, in embodiments where the stylus comprises a pressure sensor in the stylus tip, the pressure sensor continuously detects the current level of pressure against the tip. In step 604, in embodiments in which the stylus has an internal identifier, the stylus reads its stylus identifier. In step 605, the processing internal device 208 of the stylus 203 builds a data record containing whichever of these pieces of data exist—the stylus identifier, the pressure level, and/or the capacitive flux level; in embodiments with an electronic stylus, the stylus has at least one of these two types of sensors. In step 606, the stylus transmits the sensor data to the electronic device 200. In step 607, the stylus delays for an interval, the duration of which may be fixed or may be determined during configuration, and then loops back to step 602 to repeat the cycle. In some embodiments, the duration of the delay is about 37.5 ms to conform to operating system manufacturers' rules, while in others it may be determined at least in part by the communications system being used, such as the 6 ms minimum interval of some versions of the Bluetooth standard.

Figure 7:
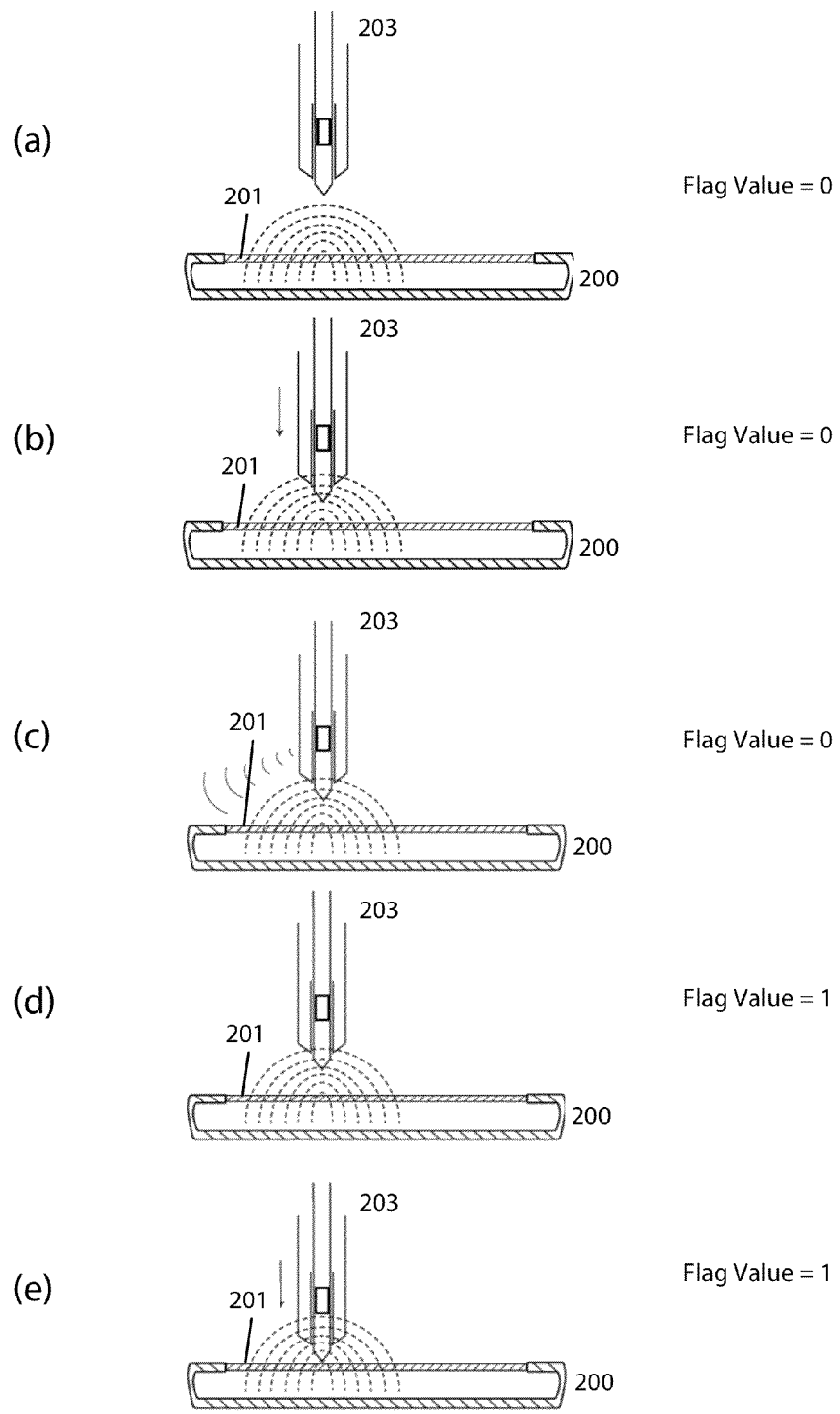
FIG. 7 is an example illustrating a stylus with a capacitive flux sensor entering a capacitive flux field.

Please refer now to FIG. 7. Initially, as shown in FIG. 7(a), the stylus is being held far away from the electronic device 200 and no capacitive flux is sensed by the stylus. As the stylus 203 enters a capacitive flux field in FIG. 7(b), the sensor 207 senses the capacitive flux field generated by the touch screen 201. As the stylus approaches the touch screen 201 more closely, as shown in FIG. 7(c), resulting in the level of the capacitive flux exceeding a threshold level, the processing electronic device 208 recognizes that the stylus 203 is close to the touch screen 201 of the electronic device 200, whereupon the signal generator 204 transmits an externally generated signal to the receptor 202. This causes application software (not shown) on the electronic device 200 to set an internal flag value such that it indicates the stylus is about to touch the screen, as shown in FIG. 7(d). The threshold value is selected such that in normal use, the stylus will be so close to the screen that a contact is imminently certain. Because capacitive flux level varies by an inverse-square law, it is possible to detect proximity with great precision, and in some embodiments, by detecting rate of change to sense a difference between hovering near a touchscreen (where rate of change is low and may be about zero) and moving toward a touchscreen (where rate of change is nonzero and increasing as distance drops), it can further be determined that a contact is imminent. By sensing and transmitting when contact is imminent, buffering time for movement data can be reduced or eliminated. Finally, in FIG. 7(e), the stylus actually touches the touch screen 201.

In some embodiments, both a capacitive flux sensor and a pressure sensor may be used. In such embodiments, actual contact between the stylus 203 and the touch screen 201 may optionally cause a second event to be generated, indicating actual contact between the stylus and the touchscreen. As capacitive touchscreens ordinarily only sense capacitance and not actual physical contact, this allows for rejection of near-touches and of very light contact, if so desired.

It should be noted that the first information can be used to generate a signal containing the identification information, and the signal transmitter 209 can further transmit the signal to the electronic device 200 before the stylus is in contact with the touch screen. In addition, if the stylus is not further in contact with the touch screen and the sensor leaves the capacitive flux field, the signal transmitter 209 can transmit a signal to inform the electronic device 200 that contact is no longer imminent.

It should be noted that, in FIG. 7, the method of operating the stylus 203 can be modified to conform to the flowchart in FIG. 6. Furthermore, the method in FIG. 7 can also use the time slot between the switching timing of the flag and the contact timing of the stylus as a parameter, so that a more complex method of operating multiple styli on the same touch screen can be developed.

Figure 8:
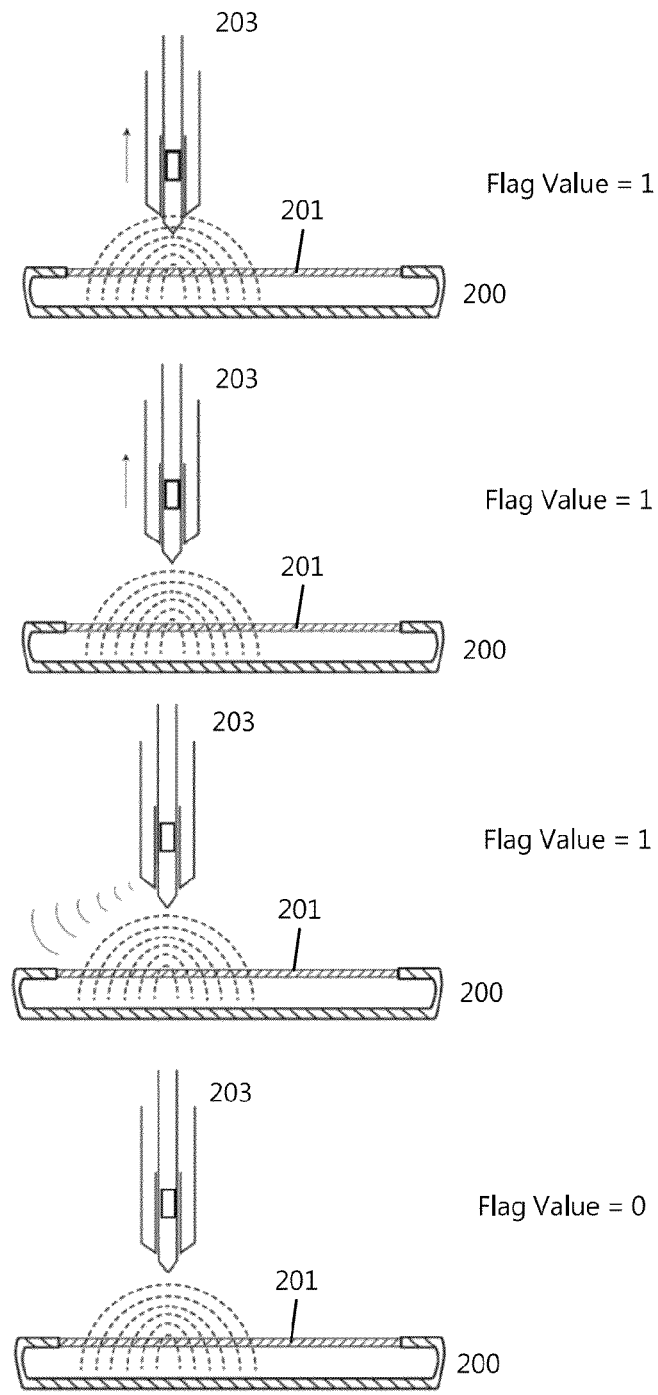
FIG. 8 is an example illustrating a stylus with a capacitive flux sensor leaving a capacitive flux field.

FIG. 8 is an example of a stylus leaving a capacitive flux field. While the stylus 203 is in the capacitive flux field, the flag value remains 1 in the electronic device 200. However, when the stylus 203 leaves the capacitive flux field, the signal generator 204 immediately transmits to the electronic device 200 the signal indicating that contact has ended, and then the electronic device 200 zeroes the flag value. By combining the approach in FIG. 7 with the approach in FIG. 8, the method of operating the stylus is completed.

Figure 9:
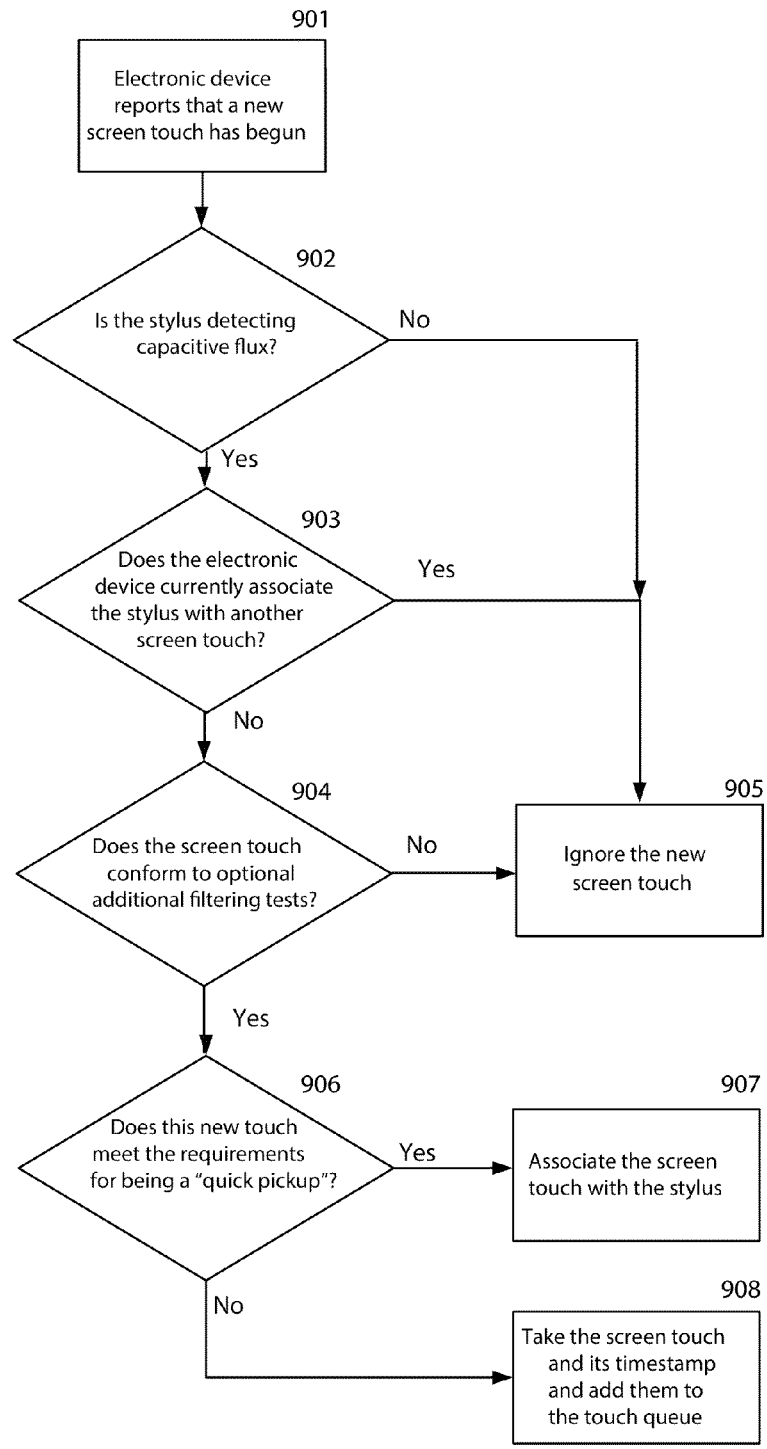
FIG. 9 is a flowchart illustrating the method performed when an electronic device recognizes an object initially touching the screen.
Figure 10:
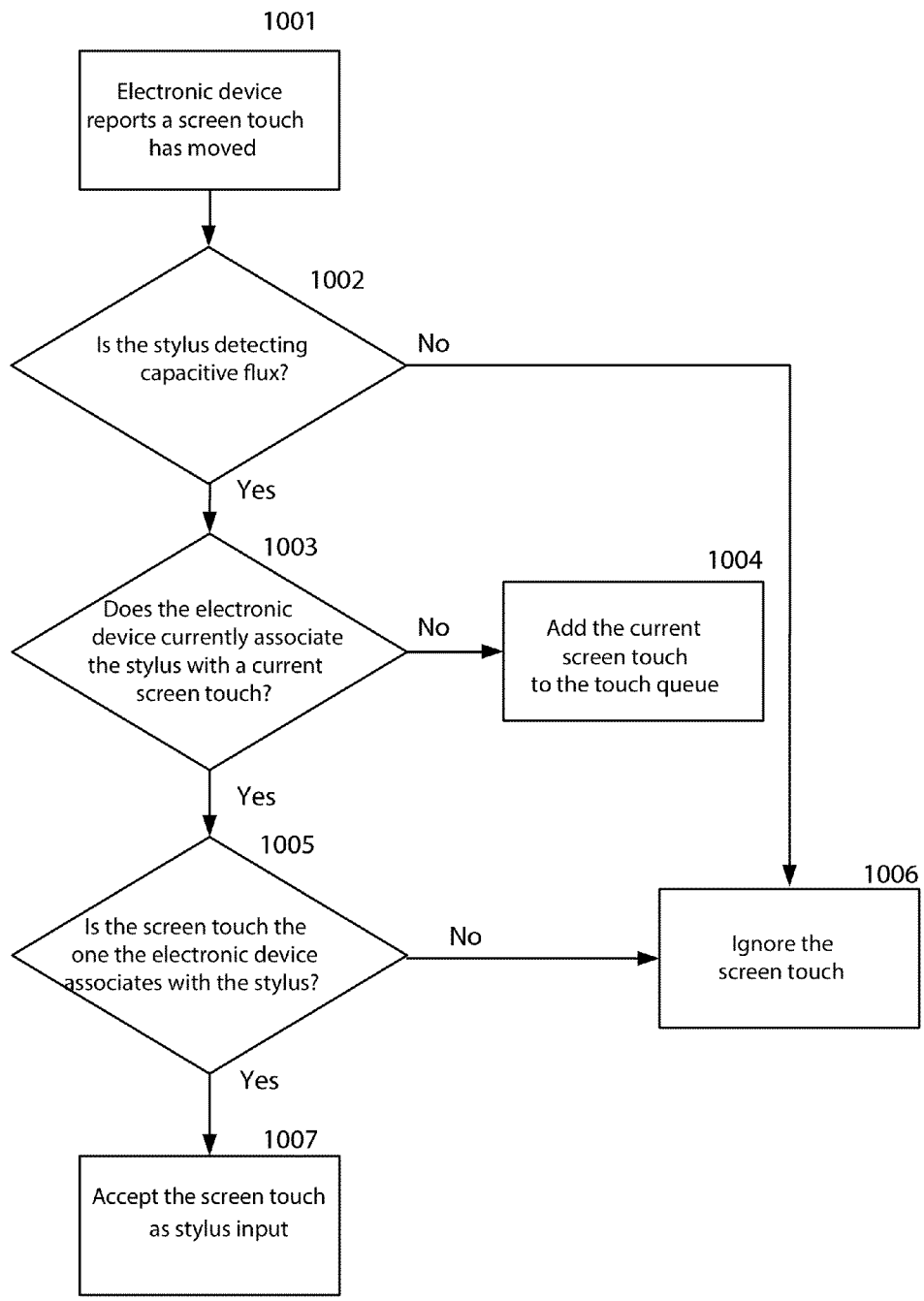
FIG. 10 is a flowchart illustrating the method performed when an electronic device recognizes an object touching and moving on the screen.
Figure 11:
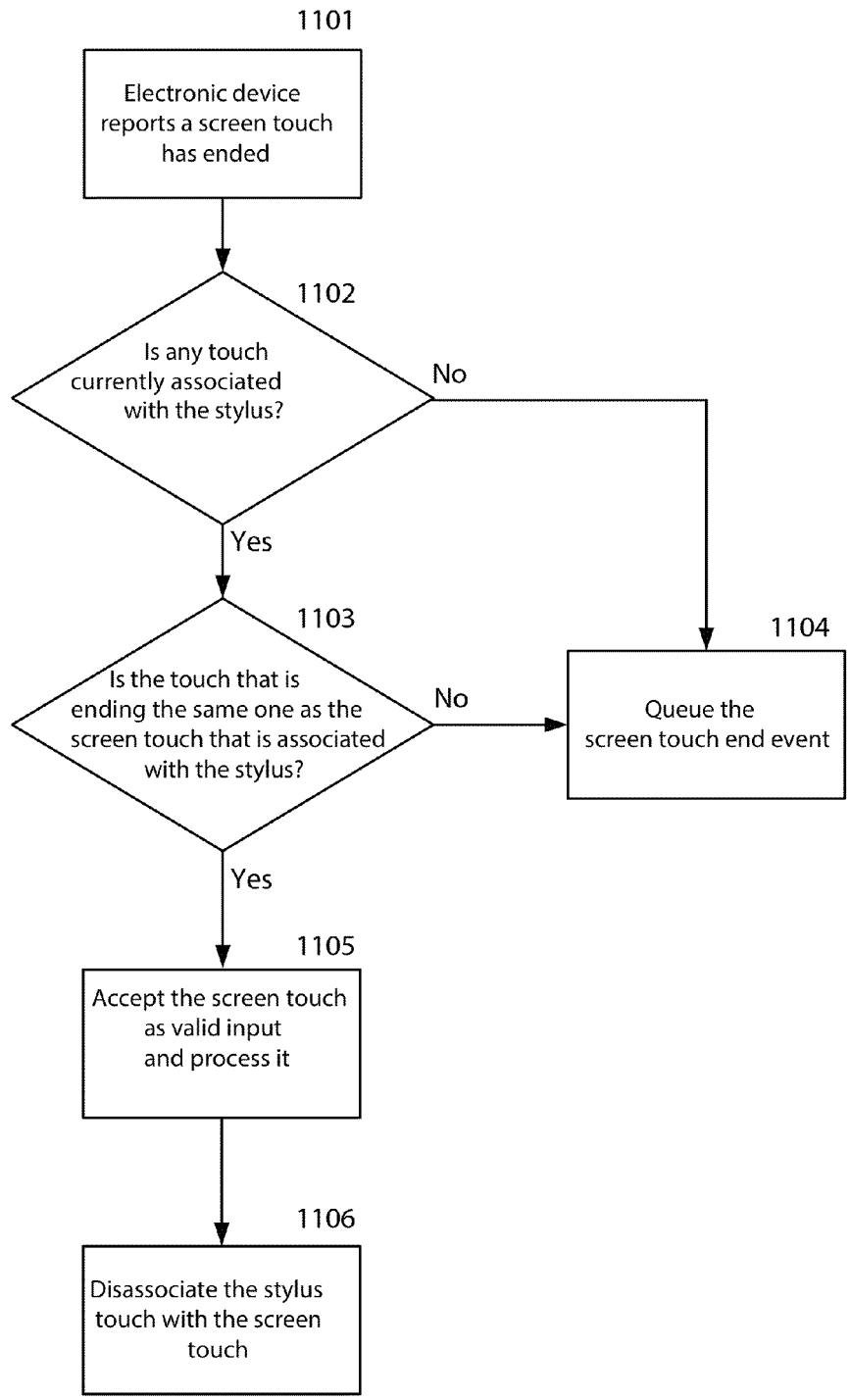
FIG. 11 is a flowchart illustrating the method performed when an electronic device determines that a screen touch has ended.

The methods illustrated with FIG. 9, FIG. 10, and FIG. 11 relate to common application-level events generated by touchscreen devices. FIG. 9 illustrates how the method behaves when a touch begins. FIG. 10 illustrates how the method behaves when a touch moves. FIG. 11 illustrates how the method behaves when a touch ends. Additionally, FIG. 12 details an optional "quick pickup" method used to reduce processing overhead in the method described in FIG. 9 when a user is making many small strokes in a short time period, for example when a user is scribbling a note down on a touchscreen device.

Touchscreen operating systems typically generate three or four subclasses of touch events: a touch start event, which is generated when a new group of capacitive level changes indicating a "touch" is detected by the hardware; a touch moved event, which is generated when a previously-known "touch" appears to have shifted position; a touch end event, which is generated when capacitances associated with a previously-known "touch" disappear; and optionally may generate a touch cancelled event, which is generated when a high-priority event causes touch processing to be suspended, for example when a cellphone with touchscreen receives an incoming call, causing the phone operating system to override the current application by, for example, suspending playing a game so that a user may receive the call and speak to the caller; embodiments may handle a touch cancelled event in the same way as a touch end event. More such touch event subclasses are possible, and may be considered subclasses of the above types. Touch events typically comprise information about the touch, such as an operating system-assigned identification number, its centroid (capacitance-level adjusted center, which may be offset from the true center of the pattern), size data such as its major and minor widths or diameter or radiuses, and the time at which the event occurred (typically with resolution of around a millisecond). The firmware or operating system typically tracks the touches as they move, so a given physical touch will generate a touch start event, zero or more touch move events, and a touch end event. These will all have the same operating system-assigned identification number.

The methods of FIGS. 9 through 13 process events as they occur, and keep track of certain data values that are shared among the various event handlers. These include values related to the quick pickup method including the previous touch end timestamp and previous touch end centroid position, a stylus-associated touch identifier value containing either a null value or the operating system-assigned identification number of a touch that is currently associated with the stylus, and a touch queue containing touch events that are being stored for subsequent processing. In some embodiments, the timestamps are duplicated into a second queue to save processing time. In some embodiments, only a subset of event data are stored in one queue and timestamps are duplicated in a second queue. Some embodiments use the operating system-assigned identification number to group together all touch events (or subsets of touch event data) that the hardware, firmware, and operating system software have identified as coming from a single physical touch.

FIG. 9 shows a flowchart of the touch start event handler. In step 901, the electronic device 200 reports that a screen touch has begun. That is, the touch screen 201 of the electronic device 200 senses an object touching the screen and generates a touch start event which is sent on to applications that have requested such events from the operating system, resulting in the touch start event handler being called. In step 902, the method may optionally check whether capacitive flux is being detected by the stylus, and further may optionally check whether the capacitive flux is being detected at sufficient strength to imply that the stylus is very close to the screen; when no flux is detected, then the method continues at step 905, else the method continues at step 903. In step 903, the method checks whether the stylus has already been associated with a current screen touch; when the stylus has not been associated with a current screen touch, then the method continues at step 904, else the method continues at step 905. In step 904, the method may optionally check whether the screen touch (information about which is in the touch start event) conforms to one or more filtering tests; when no filtering test is used or when the screen touch is found to conform to the tests, then the method continues at step 906, else the method continues at step 905. (Filtering tests are discussed further in the next paragraph.) In step 905, the method ignores the screen touch, thereby rejecting the touch start event as unwanted input, and the method ends. In step 906, the method tests whether the touch start event qualifies to be treated as a quick pickup (the detailed description of the quick pickup method is discussed below (see FIG. 12)); when the touch start event fails the test to be a quick pickup, then the method continues at step 908, else the method continues at step 907. In step 907, the method associates the screen touch with the stylus and clears out the touch queue, and the method ends. In embodiments where styluses send identification information, step 907 may further associate the identification information of a particular stylus with the screen touch, rather than merely associating the screen touch with the stylus. In step 908, the method adds the touch start event and its timestamp to the touch queue, and the method ends.

Regarding filtering tests, the method may optionally perform one or several tests in step 904 to help ensure that a screen touch is being made by a stylus. In some embodiments, the size of the screen touch is tested to determine that it falls within an acceptable size range; in some embodiments, the size and shape of the screen touch is tested to determine whether it conforms to a stylus tip shape; in some embodiments, other filtering tests or no filtering tests are performed. For example, in an embodiment which filters based on the size of the screen touch, step 904 tests a touch size reported by the operating system against a maximum radius and a minimum radius to ensure that the touch size falls within a range typically detected when a stylus tip touches the touch screen 201; when the touch size falls outside the range, the method continues at step 905, otherwise (when the touch size falls within the range) the method continues at step 906.

FIG. 10 shows a flowchart in which an electronic device 200 recognizes an object touching and moving on the screen, generating screen touch move events. In step 1001, the electronic device reports a screen touch has moved. That is, the touch screen 201 of the electronic device 200 senses a touch moving on the screen and generates a touch move event which is sent on to applications that have requested such events, causing this method to be invoked. Next, in step 1002, in some embodiments the method may optionally check whether the stylus is detecting capacitive flux; when capacitive flux is detected or no check is performed, then the method continues at step 1003, else the method continues at step 1006. In step 1003, the method checks whether the stylus has been associated with a screen touch; when it hasn't, the method continues at step 1004, else the method continues at step 1005. In step 1004, the method adds the current screen touch event to the touch queue, and the event handler completes. In step 1005, the method checks whether the screen touch is the touch that is currently associated with the stylus. When the screen touch of the touch move event is not the same touch as is currently associated with the stylus, the method continues at step 1006, else the method continues at step 1007. In step 1006, the method ignores the screen touch. That is, the electronic device 200 treats the screen touch as a non-stylus touch, rejecting it as an inadvertent touch made by a hand or finger, and the method completes. In step 1007, the electronic device 200 accepts the screen touch input as being made by the stylus and processes the input, and the method completes; for example, in performing step 1007, a drawing program might draw a line to the touch point on the screen where the screen touch is currently located, thus realizing the stylus-screen contact tracking function.

FIG. 11 shows a flowchart in which an electronic device recognizes that a screen touch has ended. In step 1101, the operating system reports that a screen touch has ended. That is, the touch screen 201 of the electronic device senses that an object has stopping contacting the screen, and the operating system generates a touch end event that is sent to applications that have requested such events. In step 1102, the method tests whether the stylus is associated with any screen touch; when a touch is associated with the stylus, the method continues at step 1103, else the method continues at step 1104. In step 1103 the method determines whether the screen touch which ended is the same screen touch that is associated with the stylus; when the screen touch that ended is not the same as the screen touch associated with the stylus, the method continues at step 1104, else the method continues at step 1105. In step 1104, in some embodiments the method adds the screen touch end event to the touch queue and the method ends. (In step 1104, in some other embodiments, the method ignores the screen touch end event and the method ends.) In step 1105, the method accepts the screen touch end event as valid input associated with the stylus and processes it accordingly; for example, in a drawing program, the application may draw a line stopping at the position of the centroid of the touch end event. In step 1106, the method disassociates the stylus contact with the screen touch, meaning that no touch is now associated with the stylus, for example by setting the stylus-associated touch identifier value to a null value, and the method completes. In some embodiments, the method of FIG. 11 may also be invoked when a stylus contact end event occurs. This provides a "sanity check" for situations in which the operating system fails to send a touch end event, thereby avoiding the risk of the software waiting forever for an event that will never arrive. In embodiments in which styluses send identification information, the stylus identifier may be used to end a particular screen touch from among a potential plurality of stylus-associated touches.

Figure 12:
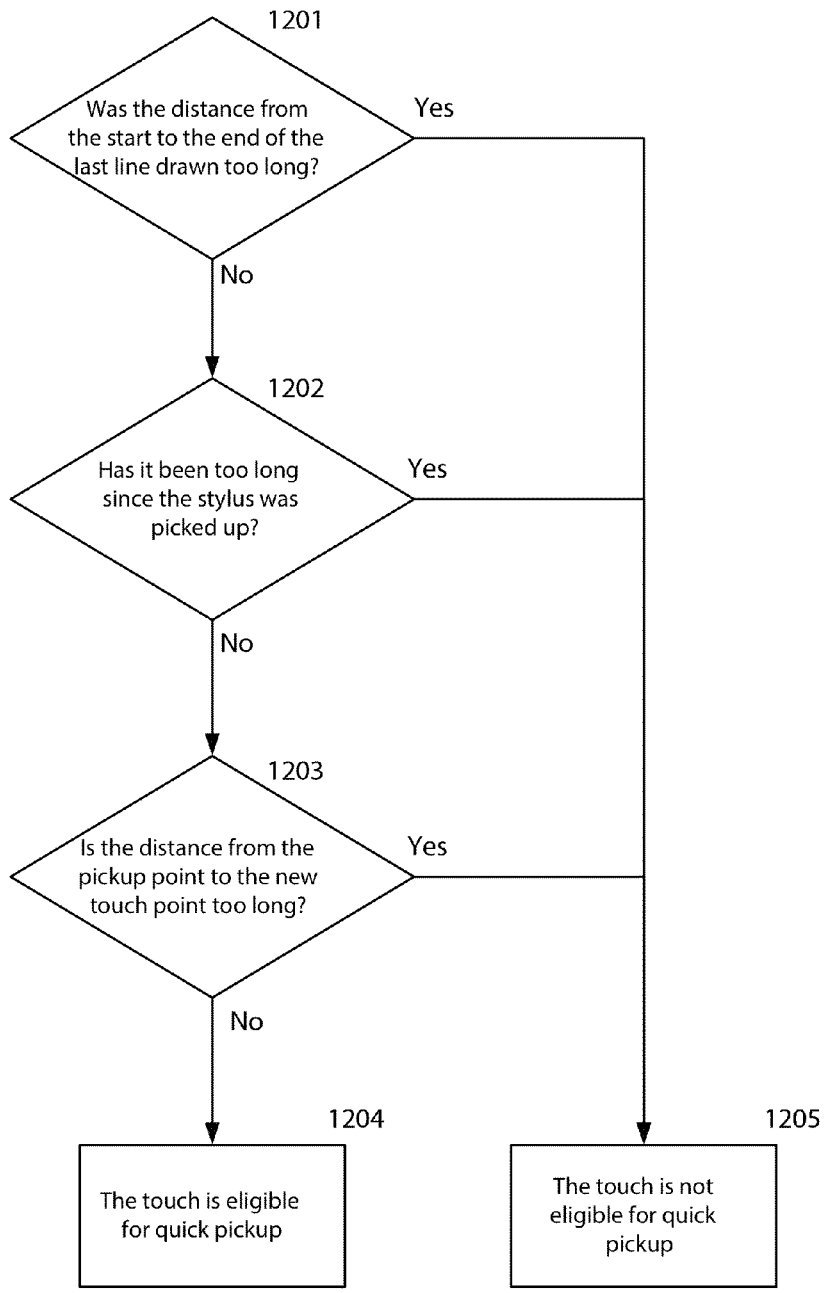
FIG. 12 is a flowchart of the quick pickup method.

FIG. 12 shows a flowchart of the optional quick pickup method. Frequently during normal use, a stylus is momentarily lifted from a touch screen and then put back down in a position very close to where it was lifted from. The quick pickup method allows the system to avoid the processing burden of repeatedly performing the stylus contact method responsible for recognizing the stylus-screen contact (described below regarding FIG. 13), for example when a user is hand-writing a note. By way of example, the plus character ('+') when written normally uses two strokes, and the stylus is normally picked up and put back down quickly in between the strokes. The test involves three parts: when a first screen touch ends within a predefined radius measured from where the first screen touch began, and a second screen touch begins within a predefined time period from the time at which the first screen touch ended, and the second screen touch begins within a predefined radius of where the first screen touch ended, then the new touch is eligible to be a quick pickup. Otherwise the new touch is not eligible to be a quick pickup. Implementation of quick pickup is optional; if it is not implemented or used, the system and method will still work correctly, but will use more computational power.

Referring to FIG. 12, the quick pickup test method is a part of the touch start event method. In step 1201, the distance from the start position of the previous line to the end position of the previous line is compared against a threshold distance, and if the threshold value is exceeded, then the method continues at step 1205, else the method continues at step 1202. In step 1202, if the time difference between the time of the last screen touch end event and the time of the current screen touch begin event exceeds a threshold duration, then the method continues at step 1205, else the method continues at step 1203. In step 1203, the distance from the position of the previous touch end event to the position of the current touch start event is compared against a threshold distance, and if the threshold is exceeded, then the method continues at step 1205, else the method continues at step 1204. In step 1204, the new touch start event is marked as a quick pickup, and the method completes. In step 1205, the new touch start event is marked as not a quick pickup, and the method completes. It should be noted that although listed in an order, the three criteria for steps 1201, 1202, and 1203 are independent of each other and may be processed in any order to still achieve the identical result.

Figure 13:
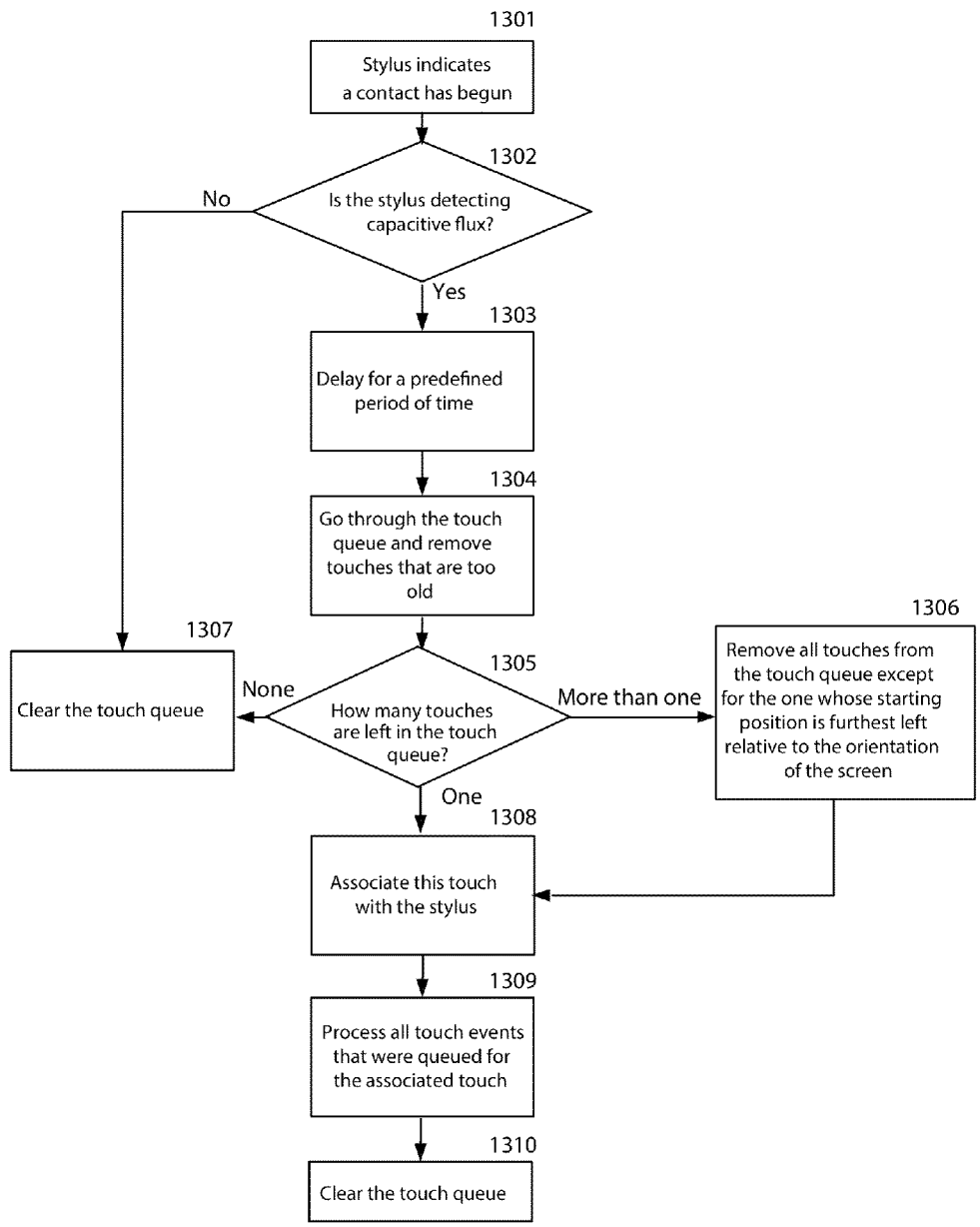
FIG. 13 is a flowchart illustrating the sequence of steps taken when an electronic device receives a stylus signal indicating a contact event.

FIG. 13 is a flowchart showing the method executed when an electronic device receives a stylus contact start event from the stylus. (As noted earlier, this may either be a signal from the stylus itself, or may be an event generated by software or firmware on the electronic device in response to an evaluation of a stream of signals received from the stylus.) In step 1301, a stylus contact start event is received, indicating that a screen touch made by the stylus may have begun. In some embodiments, step 1302 checks that capacitive flux is being detected by the stylus; in these embodiments, when no flux or insufficient flux is detected (for example, the stylus tip has been touched against a desktop or the housing of the electronic device), the method continues at step 1307; when flux is detected, the method continues at step 1303. In step 1303, the method delays processing the above information for a predefined period of time, to allow more touch events to be processed by the touch event handlers shown in FIG. 9, FIG. 10, and FIG. 11, for the purpose of synchronization between the stylus signal and the touch screen data, because sometimes the signal from the stylus will be received after the associated stylus-screen contact (touch), for example due to Bluetooth processing delays in an embodiment that uses Bluetooth for communications, and sometimes the signal from the stylus will be processed before touch events have propagated through the system. The delay tries to guarantee that the two events can be synchronized. Some embodiments use a delay of about 40 ms. Then, in step 1304, the electronic device 200 goes through the touch queue and removes touches whose timestamps indicate that they are older than the stylus event by a predefined threshold value; some embodiments limit this interval to 15 ms.

Next, in step 1305, the method will check how many touches remain in the touch queue; if the number of remaining touches is zero, then the method continues at step 1307; if the number of remaining touches is one, then the method continues at step 1308; if the number of remaining touches is greater than one, then the method continues at step 1306.

In step 1307, the method clears the touch queue, indicating that the stylus was not contacting the touch screen, and the method completes. For example, in embodiments in which the stylus comprises only a pressure sensor, the stylus may have been set down on a desk and momentarily contacted the stylus tip, resulting in an erroneous contact being suggested by the pressure data. By filtering out such events, the system can reject inadvertent input.

In step 1306, the method will determine which touch start event is positioned furthest to the left relative to the orientation of the touch screen 202 (orientation is determined by the operating system and accelerometer hardware of the electronic device), and remove all touch events from the queue whose identifiers do not match the identifier of this leftmost touch start event, and then it will continue at step 1308. When multiple touches have equal leftmost positions, the touch with the timestamp closest in time to the stylus event is selected. (The leftmost touch is selected because about ninety percent of the population is right-handed, and when holding a stylus in the right hand, a user resting the right-hand palm on the touchscreen will generate unwanted palm contact to the right of the stylus; the leftmost touch is assumed to be the stylus. However, this may optionally be a user-settable parameter, for example allowing users to set a software switch to cause the software to change method behavior, for example to remove all touches except the left-most touch, right-most touch, bottom-most touch, or top-most touch from the queue depending on the individual's handedness and preferred pen-holding and writing style; or even giving the user a graphical interface to allow the user to position a hand holding a stylus against the screen, and to indicate on a generated map where the stylus tip naturally contacts, and the method subsequently using this map to select the associated touch.) In step 1308, the method associates the selected touch with the stylus, for example by storing the operating system-assigned identification number of the selected touch in the stylus-associated touch identifier value. In step 1309, the method goes through the queue and processes all remaining touch events, whose identifiers match the touch event associated with the stylus (note that all touch events that the operating system had identified as coming from other touches were already deleted in step 1306); for example, in a drawing program, the application might draw a sequence of joined lines through the list of points belonging to the touch move events that were queued for the touch, while ignoring the touch events being queued from the user holding the side of the touchscreen with a hand. Finally, in step 1310, the electronic device clears the touch queue and the method completes. Note that unless a touch end event has occurred for the selected touch, the stylus will remain associated with the selected touch at the completion of the method of FIG. 13—see FIG. 9, FIG. 10, FIG. 11, and FIG. 12 for further discussion of what happens in such cases.

In operation, these methods cooperate to select a touch start event occurring within a specified time window surrounding a stylus contact event, to associate with the stylus the operating system generated identifier ("touch ID") of said touch event until a touch end event with the same touch ID is received, during the period from receiving the touch start event until receiving the touch end event to process touch events whose touch IDs match the touch ID associated with the stylus, and during said period to ignore or to process differently any touch events not containing the matching touch ID. An optional "quick pickup" method reduces the amount of processor time used for these methods by, after an associated touch has ended, immediately associating a new touch with the stylus when certain specified conditions are met.

The method and system of data input for an electronic device equipped with a touch screen as disclosed allows an externally generated signal in conjunction with screen contact-based input to be received and trigger a predetermined action responsive to the externally generated signal, or, alternatively, a predetermined variant of the screen contact-based input, thereby increasing the range of electronic device control in a convenient and efficient manner.

It is to be understood that the disclosure may be implemented at any level of the system, whether hardware or software, for example as software within an individual application, as an intermediary application that preprocesses input for other applications, at the OS or kernel level, or even at the hardware interface level, most likely as firmware. Furthermore, the disclosure may be implemented in a region-specific manner such that the disclosed system and/or methods are applied only to a certain region or regions of the touchscreen, while another region or regions of the touchscreen do not use the disclosed system and/or methods; for example, a drawing application having a controls region and a drawing region may implement the disclosure so that it applies only to the drawing region, but not to the controls region where the application's menus are displayed, thereby allowing the user to use any touch, whether generated by stylus or fingertip or any other device or body part, to select menu items, while rejecting non-stylus input in the drawing area to maintain precision and avoid unwanted input.

Finally, while the disclosure has been described by way of examples and in terms of preferred embodiments, it is to be understood that the disclosure is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for filtering touch event input, the method comprising:
   receiving at least one touch event,
      each touch event of the at least one touch event comprising a type, an identifier, and a timestamp;
   selecting a subset of touch events from the at least one touch event;
   adding a data node selected from each touch event of the subset of touch events to a queue of data nodes, each data node comprising a type, an identifier, and a timestamp;
   receiving a stream of sensor events from a stylus, each sensor event comprising a sensor level;
   comparing the sensor level of the each sensor event to a threshold level;
   generating a contact event from the stream of sensor events, the contact event comprising a type and a timestamp, the contact event being generated by:
      when the sensor level exceeds a threshold level and a contact flag is false, then:
         setting the contact flag to true,
         setting the timestamp of the contact event, and
         setting the type of the contact event to be a contact start, and
         calling a contact event handler; and
      when the sensor level does not exceed the threshold level and the contact flag is true, then:
         setting the contact flag to false,
         setting the timestamp of the contact event, and
         setting the type of the contact event to be a contact end, and
         calling a contact event handler;
   when the type of the contact event is a contact start event, then:
      selecting a set of data nodes from the queue of data nodes,
         wherein the type of each data node in the set of data nodes is a touch start type, and
         the timestamp of each data node in the set of data nodes is within a predetermined duration of the timestamp of the contact event; and
      when the set of data nodes is not null, then:
         selecting a data node from the set of data nodes, and
         storing the identifier of the data node in an associated touch identifier.

2. The method of claim 1,
   wherein each sensor event of the stream of sensor events further comprises a stylus identifier,
   wherein the contact event further comprises a stylus identifier,
   the method further comprising:
   when the sensor level exceeds a threshold level and a contact flag is false, then
      setting the stylus identifier of the contact event
         to the stylus identifier of the sensor event; and
   when the sensor level does not exceed a threshold level and a contact flag is true, then:
      setting the stylus identifier of the contact event
         to the stylus identifier of the sensor event.

3. The method of claim 1, where the sensor level is based upon sensing pressure.

4. The method of claim 1, where the sensor level is based upon sensing capacitive flux.

5. The method of claim 1, wherein each sensor event of the stream of sensor events comprises a first sensor level and a second sensor level, and the step of generating a contact event comprises:
   comparing the first sensor level of the each sensor event to a first threshold level;
   when the first sensor level exceeds the first threshold level and a contact flag is false, then:
      comparing the second sensor level of the each sensor event
         to a second threshold level,
      when the second sensor level exceeds the second threshold level, then:
         setting the contact flag to true;
         setting a timestamp of the contact event; and
         setting the type of the contact event to be a contact start;
   when the first sensor level does not exceed the first threshold level and a contact flag is true, then:
      setting the contact flag to false;
      setting a timestamp of the contact event; and
      setting the type of the contact event to be a contact end;
   when the second sensor level does not exceed the second threshold level and a contact flag is true, then:
      setting the contact flag to false;
      setting a timestamp of the contact event; and
      setting the type of the contact event to be a contact end; and
   wherein the first sensor level is based upon sensing capacitive flux, and
   wherein the second sensor level is based upon sensing pressure.

6. The method of claim 5, wherein
   each sensor event of the stream of sensor events
      further comprises a stylus identifier, and
   the contact event further comprises a stylus identifier,
   the method further comprising:
      when the second sensor level exceeds the second threshold level, then
         setting the stylus identifier of the contact event
            to the stylus identifier of the sensor event; and
      when the first sensor level does not exceeds a threshold level
         and a contact flag is true, then:
            setting the stylus identifier of the contact event
               to the stylus identifier of the sensor event.

7. The method of claim 1 further comprising:
   when the contact event is a contact end event, then
      clearing the associated touch identifier.

8. The method of claim 1 wherein the step of receiving at least one touch event further comprises:
   when the type of an each touch event of the at least one touch event is a touch end type,
   and the identifier of the each touch event
      equals the associated touch identifier, then:
         clearing the associated touch identifier.

9. The method of claim 8, wherein the touch event further comprises a position, and the data node further comprises a position, the method further comprising:
   after the step of clearing the associated touch identifier:
      saving the position of the data node in a previous touch end position value, and saving the timestamp of the data node in a previous touch end time value;
   and
   after the step of storing the identifier of the data node:
      saving the position of the data node in a previous touch start position value;
   and
   after the step of receiving at least one touch event
   and before the step of selecting a subset of touch events from the at least one touch event:

when the type of a touch event of the at least one touch event
is a touch start, then:
when the time of the touch event is within a predetermined duration of the previous touch end time value, then:
when the position of the touch event is within a predetermined first distance
of the previous touch end position value, then:
when the previous touch start position value
is within a predetermined second distance
of the previous touch end position value, then:
storing the identifier of the touch event
in the associated touch identifier.

10. The method of claim 1 where the step of selecting the subset of touch events from the at least one touch event comprises:
when the associated touch identifier is null, then:
when the type of the touch event is a touch start, then:
selecting the touch event for the subset;
when the type of the touch event is a touch move, then:
selecting the touch event for the subset; and
when the type of the touch event is a touch end, then:
selecting the touch event for the subset;
when the associated touch identifier is not null, then:
when the type of the touch event is a touch start, then:
discarding the touch event;
when the type of the touch event is a touch move, then:
when the identifier of the touch event
does not match the associated touch identifier,
then:
discarding the touch event; and
when the identifier of the touch event
matches the associated touch identifier,
then:
selecting the touch event for the subset; and
when the type of the touch event is a touch end, then:
when the identifier of the touch event
does not match the associated touch identifier,
then:
selecting the touch event for the subset.

11. The method of claim 10, wherein the touch event further comprises size data, the method further comprising:
when the associated touch identifier is null,
and the type of the touch event is a touch start, then:
when the size data of the touch event falls outside a size range, then:
discarding the touch event.

12. The method of claim 1 wherein each touch event of the at least one touch event further comprises a position, and each data node further comprises a position, and the step of selecting a data node from the set of data nodes comprises:
selecting a leftmost data node from the set of data nodes.

13. The method of claim 1 further comprising, after the step of receiving a contact event and before the step of selecting the subset of touch events:
delaying by a predetermined interval.

14. A computer system comprising:
one or more processors;
a communications receptor;
a touchscreen operatively coupled to the one or more processors;
a computer readable medium operatively coupled to the one or more processors; and
logic stored in the computer readable medium that, when executed from the computer readable medium by the one or more processors, causes the computer to filter touchscreen input by at least:
receiving at least one touch event,
each touch event of the at least one touch event comprising a type, an identifier, and a timestamp;
selecting a subset of touch events from the at least one touch event;
adding a data node selected from each touch event of the subset of touch events to a queue of data nodes, each data node comprising a type, an identifier, and a timestamp;
receiving a stream of sensor events from a stylus, each sensor event comprising a sensor level;
comparing the sensor level of the each sensor event to a threshold level;
generating a contact event from the stream of sensor events, the contact event comprising a type and a timestamp, the contact event being generated by:
when the sensor level exceeds a threshold level and a contact flag is false, then:
setting the contact flag to true,
setting the timestamp of the contact event, and
setting the type of the contact event to be a contact start, and
calling a contact event handler; and
when the sensor level does not exceed the threshold level and the contact flag is true, then:
setting the contact flag to false,
setting the timestamp of the contact event, and
setting the type of the contact event to be a contact end, and
calling a contact event handler;
when the type of the contact event is a contact start event, then:
selecting a set of data nodes from the queue of data nodes,
wherein the type of each data node in the set of data nodes is a touch start type, and
the timestamp of each data node in the set of data nodes is within a predetermined duration of the timestamp of the contact event; and
when the set of data nodes is not null, then:
selecting a data node from the set of data nodes, and
storing the identifier of the data node in an associated touch identifier.

15. The system of claim 14 where the communications receptor is selected from the group consisting of a Bluetooth transceiver, a microphone, a Wi-Fi transceiver, a USB port, and an infrared receiver.

16. The system of claim 14, further comprising a stylus, wherein the stylus comprises:
a first sensor, and a signal generator,
wherein the first sensor is electrically coupled to the signal generator, and
the signal generator periodically emits a signal,
the signal comprising a reading of the first sensor.

17. The system of claim 16, wherein the signal further comprises a stylus identifier.

18. The system of claim 16 where the first sensor is a pressure sensor.

19. The system of claim 16 where the first sensor is a capacitive flux sensor.

20. The system of claim 16, wherein the first sensor is a pressure sensor, and wherein the stylus further comprises a capacitive flux sensor, and wherein the reading is a first reading, and wherein the signal emitted by the signal generator further comprises a second reading of the capacitive flux sensor.

\* \* \* \* \*